US012770863B2

(12) United States Patent
Wang

(10) Patent No.: US 12,770,863 B2
(45) Date of Patent: Oct. 20, 2026

(54) HIGH-COMPACTION LITHIUM IRON PHOSPHATE POSITIVE ELECTRODE MATERIAL, PREPARATION METHOD THEREOF, POSITIVE ELECTRODE AND BATTERY INCLUDING THE SAME

(71) Applicant: HUBEI WANRUN NEW ENERGY TECHNOLOGY CO., LTD., Shiyan City (CN)

(72) Inventor: Qin Wang, Shiyan City (CN)

(73) Assignee: HUBEI WANRUN NEW ENERGY TECHNOLOGY CO., LTD., Shiyan City (CN)

( * ) Notice: Subject to any disclaimer, the term of this patent is extended or adjusted under 35 U.S.C. 154(b) by 601 days.

(21) Appl. No.: 18/260,886

(22) PCT Filed: Dec. 9, 2022

(86) PCT No.: PCT/CN2022/137810
§ 371 (c)(1),
(2) Date: Jul. 10, 2023

(87) PCT Pub. No.: WO2023/207121
PCT Pub. Date: Nov. 2, 2023

(65) Prior Publication Data

US 2024/0274797 A1 Aug. 15, 2024

(30) Foreign Application Priority Data

Apr. 25, 2022 (CN) ......................... 202210440824.5

(51) Int. Cl.

| | |
|---|---|
| ***H01M 4/131*** | (2010.01) |
| ***C01B 35/14*** | (2006.01) |
| ***H01M 4/133*** | (2010.01) |
| ***H01M 4/36*** | (2006.01) |
| ***H01M 4/58*** | (2010.01) |
| ***H01M 4/587*** | (2010.01) |
| *H01M 4/02* | (2006.01) |

(52) U.S. Cl.
CPC ........... *H01M 4/366* (2013.01); *C01B 35/143* (2013.01); *H01M 4/131* (2013.01); *H01M 4/133* (2013.01); *H01M 4/5825* (2013.01); *H01M 4/587* (2013.01); *C01P 2002/52* (2013.01); *C01P 2002/72* (2013.01); *C01P 2004/03* (2013.01); *C01P 2004/53* (2013.01); *C01P 2004/61* (2013.01); *C01P 2004/62* (2013.01); *C01P 2006/11* (2013.01); *C01P 2006/40* (2013.01); *H01M 2004/021* (2013.01); *H01M 2004/028* (2013.01)

(58) Field of Classification Search
None
See application file for complete search history.

(56) References Cited

FOREIGN PATENT DOCUMENTS

| | | | |
|---|---|---|---|
| CN | 101807697 | A | 8/2010 |
| CN | 102074689 | A | 5/2011 |
| CN | 102569738 | A | 7/2012 |
| CN | 103078113 | A | 5/2013 |
| CN | 103219516 | A | 7/2013 |
| CN | 107256968 | A | 10/2017 |
| CN | 110127646 | A | 8/2019 |
| CN | 108878797 | B | 9/2021 |
| CN | 114759178 | A | 7/2022 |
| EP | 2698345 | A1 | 2/2014 |

OTHER PUBLICATIONS

Examination Report mailed Nov. 1, 2024 in Indian Application No. 202224069334, 6 pages.
Second Office Action mailed Jan. 10, 2023 in Chinese Application No. 202210440824.5, with English translation, 14 pages.
Decision of Rejection mailed Apr. 6, 2023 in Chinese Application No. 202210440824.5, with English translation, 12 pages.
Reexamination Notification mailed Feb. 23, 2024 in Chinese Application No. 202210440824.5, with English translation, 16 pages.
Reexamination Decision mailed May 31, 2024 in Chinese Application No. 202210440824.5, with English translation, 17 pages.
International Search Report for PCT/CN2022/137810 mailed Feb. 28, 2023, 5 pages.
Written Opinion of the ISA for PCT/CN2022/137810 mailed Feb. 28, 2023, 4 pages.
Chinese Office Action w/English translation for CN 202210440824.5 dated Oct. 25, 2022, 12 pages.

*Primary Examiner* — Carlos Barcena
(74) *Attorney, Agent, or Firm* — The Sun IP Law

(57) ABSTRACT

A high-compaction lithium iron phosphate positive electrode material, a preparation method thereof, a positive electrode and a battery including the same. The high-compaction lithium iron phosphate positive electrode material comprises lithium iron phosphate of formula $LiFe_{1-x-y}V_xTi_y(BO_3)_z(PO_4)_{1-z}$, and carbon coated on a surface of the lithium iron phosphate, wherein, $0.001 \leqslant x \leqslant 0.01$, $0.001 \leqslant y \leqslant 0.01$, and $0.05 \leqslant z \leqslant 0.2$. The high-compaction lithium iron phosphate positive electrode material has a high compacted density, a high specific capacity, and excellent rate performance and cycle performance, and is useful for preparing batteries having a high compacted density, a high capacity, good rate performance and cycle performance, which are suitable for high-end pure electric vehicles having a long driving mileage.

10 Claims, 4 Drawing Sheets

HIGH-COMPACTION LITHIUM IRON PHOSPHATE POSITIVE ELECTRODE MATERIAL, PREPARATION METHOD THEREOF, POSITIVE ELECTRODE AND BATTERY INCLUDING THE SAME

The present application is the U.S. national phase of International Application No. PCT/CN2022/137810 filed Dec. 9, 2022, which designated the U.S. and claims the priority of Chinese invention patent application No. 202210440824.5 filed on Apr. 25, 2022, entitled "High-compaction lithium iron phosphate positive electrode material, preparation method thereof, positive electrode and battery including the same", the disclosures of each of which are incorporated by reference herein.

TECHNICAL FIELD

The present disclosure is directed to the field of batteries, in particular to a high-compaction lithium iron phosphate positive electrode material, a preparation method thereof, a positive electrode and a battery including the same.

BACKGROUND

Lithium iron phosphate material, which is currently the main lithium power battery material, has a theoretical specific capacity of 170 mAh/g and an actual maximum specific capacity of generally 160 mAh/g (0.1 C, 25° C.) in a battery product. However, the actual maximum specific capacity of a ternary material is up to 220 mAh/g (0.1 C, 25° C.), which is greatly different from that of the lithium iron phosphate material, but the lithium iron phosphate material has advantages of good safety, long service life, and low cost.

The true density of lithium iron phosphate is 3.6 g/mL. However, due to containing of carbon and voids, the compacted density of lithium iron phosphate is generally much lower than 3.6 g/mL. Currently, the compacted density of the commercially available lithium iron phosphate is generally up to 2.5 g/mL. In the case of an excessively high compacted density, the specific capacity of the lithium iron phosphate obtained by conventional preparation methods is relatively low, generally lower than 152 mAh/g.

SUMMARY

In view of this, the technical problem to be solved by the present disclosure is to provide a high-compaction lithium iron phosphate positive electrode material, the preparation method thereof, a positive electrode and a battery including the same, and the high-compaction lithium iron phosphate positive electrode material provided by the present disclosure has a high compacted density, a high specific capacity, and excellent rate performance and cycle performance.

The present disclosure provides a high-compaction lithium iron phosphate positive electrode material, comprising: lithium iron phosphate of formula $LiFe_{1-x-y}V_xTi_y(BO_3)_z(PO_4)_{1-z}$ (I), and carbon coated on a surface of the lithium iron phosphate, where, $0.001 \leq x \leq 0.01$, $0.001 \leq y \leq 0.01$, and $0.05 \leq z \leq 0.2$. In one embodiment, $LiFe_{1-x-y}V_xTi_y(BO_3)_z(PO_4)_{1-z}$ (I), where, $0.001 \leq x \leq 0.007$, $0.001 \leq y \leq 0.005$, and $0.05 \leq z \leq 0.15$. The high-compaction lithium iron phosphate positive electrode material of the present disclosure is doped with vanadium, titanium and boron, where, the doping of vanadium may form a three-dimensional channel for lithium in the lithium iron phosphate, and improve the capacity and rate performance; the doping of boron may improve the specific capacity of the material, and at the same time, due to the doping of boron and phosphorus with each other, the conductivity of the material is improved, and the specific capacity of the material is further improved.

In the present disclosure, the lithium iron phosphate comprises a first-size particle and a second-size particle; the particle size of the first-size particle is larger than the particle size of the second-size particle; the proportion of the first-size particles is smaller than that of the second-size particles; and the carbon is coated on the surface of each of the first-size particle and the second-size particle. In one embodiment, the particle size of the first-size particle is 2-4 μm; the particle size of the second-size particle is 0.2-0.4 μm; the proportion of the first-size particles is 10-30%, and the proportion of the second-size particles is 70-90%; and the content of the carbon is 1-5 wt %. The high-compaction lithium iron phosphate positive electrode material provided by the present disclosure achieves a high compacted density by blending large and small particles. In one embodiment, the compacted density of the high-compaction lithium iron phosphate positive electrode material of the present disclosure is 2.5-3.0 g/mL, and preferably 2.67 g/mL. In one embodiment, the specific capacity of the high-compaction lithium iron phosphate positive electrode material of the present disclosure is 100-200 mAh/g, and preferably 154.1 mAh/g. The high-compaction lithium iron phosphate positive electrode material provided by the present disclosure is doped with vanadium, titanium and boron, and at the same time, has large and small particles blended and a carbon-coated structure, has good conductivity, a high specific capacity and a high compacted density.

The present disclosure provides a method for preparing the above-mentioned high-compaction lithium iron phosphate positive electrode material, comprising steps of:

step A): mixing a phosphorus source, an iron source, a lithium source, a carbon source and water to obtain a mixture, to which spray drying and sintering are sequentially applied to obtain a precursor material; and step B): mixing a lithium source, a carbon source, a boron source, a vanadium source, a titanium source, water and the precursor material obtained from step A) to obtain a mixture, to which spray drying and sintering are sequentially applied to obtain the high-compaction lithium iron phosphate positive electrode material.

In the present disclosure, a phosphorus source, an iron source, a lithium source, a carbon source and water are mixed first, followed by spray drying and sintering the mixture, to obtain a precursor material. Specifically, in the present disclosure, the phosphorus source, the iron source, the lithium source, the carbon source and water are mixed and slurried first to obtain a slurry. In one embodiment, the phosphorus source is one or more selected from iron phosphate, ammonium monohydrogen phosphate, ammonium dihydrogen phosphate, diammonium hydrogen phosphate, and ammonium phosphate; the iron source is one or more selected from ferric phosphate, ferrous oxalate, ferric nitrate, ferrous chloride, and ferrous sulfate; the lithium source is one or more selected from lithium carbonate, lithium hydroxide, lithium phosphate, and lithium bicarbonate; and the carbon source is one or more selected from glucose, sucrose, polyethylene glycol, acetylene black, citric acid, and soluble starch. In one embodiment, the molar ratio of P, Fe and Li in the phosphorus source, iron source and lithium source is 1:1:1.0-1.1, and preferably 1:1:1.02-1.04.

In the present disclosure, the raw materials are mixed and slurried to obtain a slurry, and then the slurry is ground first and then spray-dried. In one embodiment, the slurry is ground to have a particle size of 500-700 nm. In one embodiment, the solid content of the ground slurry is 30-40 wt %. In one embodiment, the ground slurry is sprayed dried to have a particle size of 3-6 μm.

In the present disclosure, the spray-dried material is sintered, and the sintering is carried out in a roller furnace, the furnace pressure in the roller furnace is 100-150 Pa, and a precursor material is obtained after the sintering. In one embodiment, the roller furnace comprises a heating section, a holding section and a cooling section, and the sintering is carried out by heating up, holding and cooling down in the heating section, the holding section and the cooling section sequentially, and the whole cycle takes 25-30 hours. In one embodiment, the sintering is carried out at a temperature of 700-900° C., and preferably 790-820° C., for 10-15 hours, and preferably 12-15 hours. The sintering in the present disclosure is carried out at a higher temperature, so that the carbon content of the obtained precursor material is lower, so as to obtain the blending of large and small particles. In one embodiment, the carbon content of the precursor material is 0.1-0.3 wt %. The sintered material is cooled for 5-6 hours and discharged. In the present disclosure, the sintered material is also pulverized. In one embodiment, the sintered material is pulverized to have a particle size of 1.9-2.5 μm.

In the present disclosure, after the precursor material is obtained, a lithium source, a carbon source, a boron source, a vanadium source, a titanium source, water and the precursor material obtained from step A) are mixed, and then spray dried and sintered sequentially to obtain the high-compaction lithium iron phosphate positive electrode material. Specifically, in the present disclosure, after the precursor material is obtained, the precursor material is added with water and a carbon source first, and the mixture is slurried, and then a lithium source, a vanadium source, and a boron source are added, and dissolved, and then the material obtained is ground, and then a titanium source is added, and the reaction is carried out. In one embodiment, the grinding specifically comprises: grinding the material to have a particle size of 500-700 nm, and preferably 600 nm. In one embodiment, the reaction is carried out under stirring for 10-20 min at a stirring rate of 200-500 r/min, and preferably 300 r/min.

In one embodiment, the vanadium source is one or more selected from vanadium carbonate, vanadium pentoxide, and ammonium metavanadate; the boron source is one or more selected from boric acid, trimethyl borate, lithium metaborate, lithium borate and diboron trioxide; the titanium source is one or more selected from tetrabutyl titanate and tetraisopropyl titanate; and the carbon source and the lithium source are the same as described above, which will not be repeated here. In one embodiment, the molar ratio of Li, Fe, V, Ti, B, and P in the mixture of the lithium source, carbon source, boron source, vanadium source, titanate, water and the precursor material, which are mixed in step B) is 1:1-x-y:x:y:z:1-z, where, $0.001 \leqslant x \leqslant 0.01$, $0.01 \leqslant y \leqslant 0.1$, and $0.05 \leqslant z \leqslant 0.2$. The present disclosure achieves the doping of anions and cations in the material by introducing the vanadium source and the boron source; at the same time, the carbon source is introduced a second time for secondary carbon replenishment, which further improves the carbon coating, and improves the ion conductivity and electronic conductivity; and after the titanium source is introduced, the surface of the solid particles of the material will be coated with the precipitated hydrolyzate of the titanium source, so that titanium will be dispersed and mixed more uniformly.

In the present disclosure, after the lithium source, carbon source, boron source, vanadium source, titanate, water and the precursor material obtained from step A) are mixed, the obtained material is spray-dried. In one embodiment, the obtained material is spray-dried until the obtained material has a particle size of 10-20 μm, a tap density of 1.8-2.0 g/mL, and a moisture content of less than 0.5 wt %.

In the present disclosure, the obtained material is spray-dried and sintered to obtain the high-compaction lithium iron phosphate positive electrode material, where the sintering is carried out in a roller furnace, in the roller furnace, the furnace pressure is 30-50 Pa, and the humidity is 3% or less. In one embodiment, the sintering is carried out at a temperature of 600-700° C., and preferably 650-700° C., for 4-8 hours. The material obtained after sintering is cooled to a temperature of ≤80° C., and then discharged to obtain the high-compaction lithium iron phosphate positive electrode material. In one embodiment, the cooling time is 7-8 hours.

In the present disclosure, the obtained high-compaction lithium iron phosphate positive electrode material undergoes pulverization, screening, iron removal, and packaging. In one embodiment, the pulverization is specifically: pulverizing the obtained high-compaction lithium iron phosphate positive electrode material by air flow until it has a D50 of 0.5-1.5 μm, and preferably 1.3 μm. In one embodiment, the iron removal is specifically: performing iron removal with an electromagnetic iron remover on the obtained high-compaction lithium iron phosphate positive electrode material until the magnetic substance is ≤0.5 ppm. In one embodiment, the packaging is carried out in a constant temperature and humidity room.

The present disclosure also provides a method for preparing a high-density ferric phosphate, and the high-density ferric phosphate as prepared may be used as the iron source and the phosphorus source as described in the above-mentioned method for preparing the high-compaction lithium iron phosphate positive electrode material, and the preparation process comprises the following steps: mixing a ferrous source, a chelating agent, a phosphorus source, an oxidant and water, heating and reacting the mixture, and then calcining the material obtained after reaction to obtain the high-density ferric phosphate.

Specifically, in the present disclosure, a ferrous source and a chelating agent are mixed first, dissolved in water, and the solution is heated, and then a phosphorus source and an oxidant are added while the solution is being stirred, and the reaction is carried out, the material obtained after reaction is slurried and washed, and then calcined to obtain the high-density ferric phosphate. In one embodiment, ferrous chloride and EDTA are mixed first, and dissolved in water so that the concentration of EDTA is 0.01-0.02 mol/L, and then the solution is heated to a temperature of 80-100° C., then phosphoric acid aqueous solution and hydrogen peroxide are added while the solution is being stirred, and the reaction is carried out. The material obtained after reaction is slurried and washed, and then calcined in a rotary kiln to obtain the high-density ferric phosphate; and the specific surface area of the high-density ferric phosphate is 2-4 $m^2/g$. In one embodiment, when phosphoric acid aqueous solution and hydrogen peroxide are added for reaction, the reaction system is evacuated, and the water vapor and gas generated are drawn out and absorbed by being sprayed with pure water to obtain a hydrochloric acid solution; iron powder is added to react with the hydrochloric acid solution until an end-point pH of 3.5-5 is reached, and ferrous chloride solution is recovered. In one embodiment, the material obtained after the reaction is slurried and washed with pure water, and the washed pure water is recycled.

The present disclosure also provides a positive electrode comprising the above-mentioned high-compaction lithium iron phosphate positive electrode material. The present disclosure also provides a battery comprising the above positive electrode.

The high-compaction lithium iron phosphate positive electrode material provided by the present disclosure comprises lithium iron phosphate of formula $LiFe_{1-x-y}V_xTi_y(BO_3)_z(PO_4)_{1-z}$ (I), and carbon coated on a surface of the lithium iron phosphate, where, $0.001 \leqslant x \leqslant 0.01$, $0.001 \leqslant y \leqslant 0.01$, and $0.05 \leqslant z \leqslant 0.2$. The high-compaction lithium iron phosphate positive electrode material provided by the present disclosure has a high compacted density, a high specific capacity, and excellent rate performance and cycle performance, and is useful for preparing batteries having a high compacted density, a high capacity, good rate performance and cycle performance, which are suitable for high-end pure electric vehicles having a long driving mileage.

DETAILED DESCRIPTION

The present disclosure discloses a high-compaction lithium iron phosphate positive electrode material, a preparation method thereof, a positive electrode and a battery including the same. Those skilled in the art can refer to the content herein to appropriately improve the process parameters to achieve this. In particular, it should be noted that all similar substitutions and modifications will be apparent to those skilled in the art, and they are all considered to be encompassed in the present disclosure. The methods and applications of the present disclosure have been described by means of preferred embodiments, and it is apparent that the person concerned can implement and apply the techniques of present disclosure by making modifications or appropriate changes and combinations to the methods and applications herein without departing from the content, spirit and scope of the present disclosure.

The present disclosure is further described below in conjunction with examples:

EXAMPLE 1

An appropriate amount of iron powder was added in a hydrochloric acid solution, and reaction was carried out to reach an end-point pH of 3.5, then the solution was filtered to obtain a ferrous chloride solution with a concentration of 1.8 mol/L, and then EDTA was added thereto, so that the concentration of EDTA in the solution was 0.015 mol/L, the above solution was put in a sealed reaction kettle, heated up to a temperature of 90° C., then a phosphoric acid solution with a concentration of 4 mol/L and hydrogen peroxide with a mass concentration of 29% were added while the solution was being stirred, so that the molar ratio of the ferrous chloride, phosphoric acid, and hydrogen peroxide was 1:1.03:0.65, meanwhile the sealed reaction kettle was evacuated to reach a vacuum degree of −0.08 MPa, and the gas generated was drawn out and absorbed by being sprayed with pure water to obtain a hydrochloric acid solution which was recycled; the remaining material after the evaporation was added with pure water and was stirred and slurried to obtain a slurry, and then the slurry was filtered and washed with pure water to obtain ferric phosphate dihydrate; the water generated from the washing may be mixed with pure water for the spray absorption; and the obtained ferric phosphate dihydrate was calcined in a rotary kiln to obtain anhydrous ferric phosphate.

Figure 1:
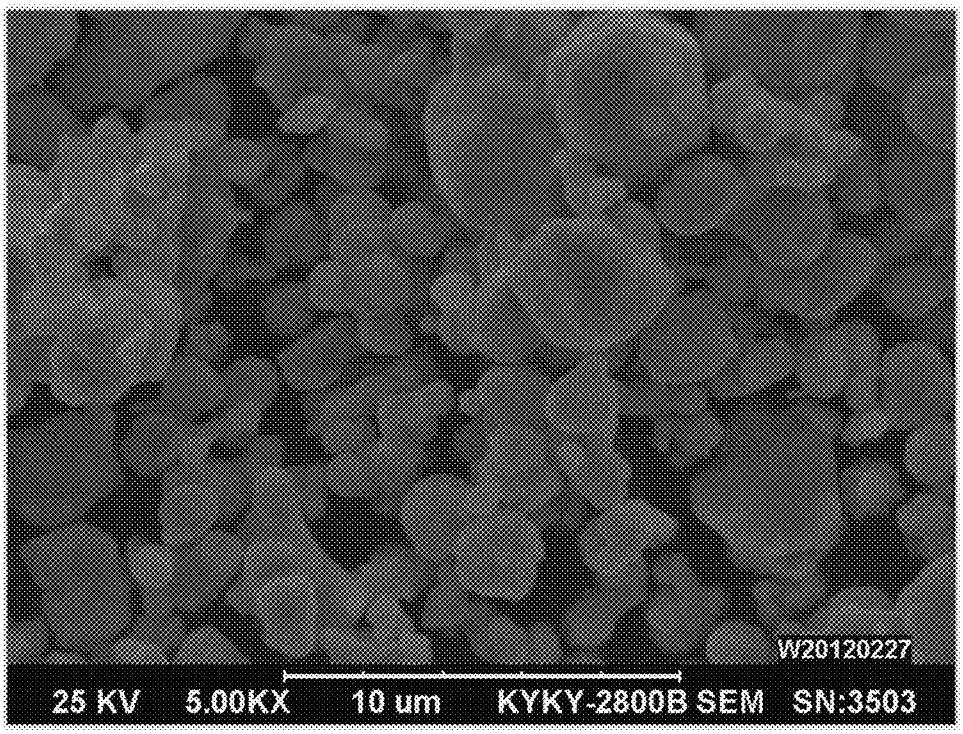
FIG. 1 is the scanning electron microscope image of the anhydrous ferric phosphate of the present disclosure.

The morphology of the anhydrous ferric phosphate was characterized by a scanning electron microscope, and the results are shown in FIG. 1, which is a scanning electron microscope image of the anhydrous ferric phosphate of the present disclosure.

It can be seen from FIG. 1 that the anhydrous ferric phosphate has relatively high compactness and larger particles, which is suitable for preparing lithium iron phosphate with a high compacted density.

The physical and chemical indicators of the anhydrous ferric phosphate were characterized, and the results are shown in Table 1.

TABLE 1

| Items | | Units | Results |
|---|---|---|---|
| Elemental composition | Fe | wt % | 36.31 |
| | P | | 20.28 |
| | Ca | ppm | 12.5 |
| | Mg | | 18.5 |
| | Na | | 15.7 |
| | Iron to phosphorus molar ratio | / | 0.991 |
| Specific surface area | | $m^2/g$ | 3 |
| Particle size | D50 | μm | 5.9 |
| Tap density | | g/mL | 1.03 |
| Apparent density | | g/mL | 0.57 |
| Moisture | | % | 0.18 |
| Magnetic substance | | ppm | 0.25 |

It can be seen from Table 1 that the anhydrous ferric phosphate has a very low impurity content, a small specific surface area as measured by BET method, and a relatively large D50, which correspond to the results shown in FIG. 1.

EXAMPLE 2

Lithium carbonate and the anhydrous ferric phosphate obtained from Example 1 were mixed at a mass ratio of 0.235:1, and polyethylene glycol (PEG) and water were added simultaneously and the mixture was slurried, the material obtained after slurrying was ground by a sand mill to have a particle size of 700 nm to obtain a slurry, the mass fraction of the solids in the slurry was 35%; and then the slurry was spray-dried to have a particle size of 6 μm.

The above spray-dried material was put into a roller furnace into which nitrogen was introduced, the furnace pressure in the roller furnace was adjusted to 100 Pa, and the spray-dried material was calcinated at 820° C. for 15 hours to obtain a precursor material, the carbon content of the precursor material was maintained at 0.1 wt %, the entire calcination cycle was 30 hours, and the cooling time was 6 hours.

The above precursor material was pulverized to have a particle size of 1.9 μm by a pulverizer, then pure water was added, then a mixture of glucose and PEG was added, and the solution was stirred and slurried, and then lithium hydroxide, ammonium metavanadate and boric acid were added, and stirred at a speed of 300 r/min to be dissolved; then the material obtained after stirring was put into a sand mill and ground to have a particle size of 600 nm, then tetrabutyl titanate was added with a metering pump while the material was being stirred over a period of 60 min, and then the material was continued to be stirred at a speed of 300 r/min for 20 min; where, the mass ratio of the precursor material obtained after the pulverization, pure water, glucose, PEG, lithium hydroxide, ammonium metavanadate, boric acid, and tetrabutyl titanate was 1:4:0.05:0.05:0.015:0.005:0.05:0.01.

The above material obtained after mixing was spray-dried to obtain a spray-dried material having a particle size of 18 μm, a tap density of 1.9 g/mL, and a water mass fraction of less than 0.5%. Then the spray-dried material was put into a roller furnace, the furnace pressure in the roller furnace was adjusted to 50 Pa, the humidity in the roller furnace was kept at 3% or less, and calcination was carried out at 700° C. for 8 hours, then cooling was carried out for 8 hours, and the material was discharged after being cooled to a temperature ≤80° C. to obtain the high-compaction lithium iron phosphate positive electrode material of the present disclosure.

After the above high-compaction lithium iron phosphate positive electrode material was discharged, it went through air jet pulverization to have a particle size D50 of 1.3 μm, and then it underwent screening, iron-removal and packaging. The iron removal removed iron with an electromagnetic iron remover until the magnetic substance in the material was ≤0.5 ppm; and the packaging was carried out in a constant temperature and humidity room.

Figure 2:
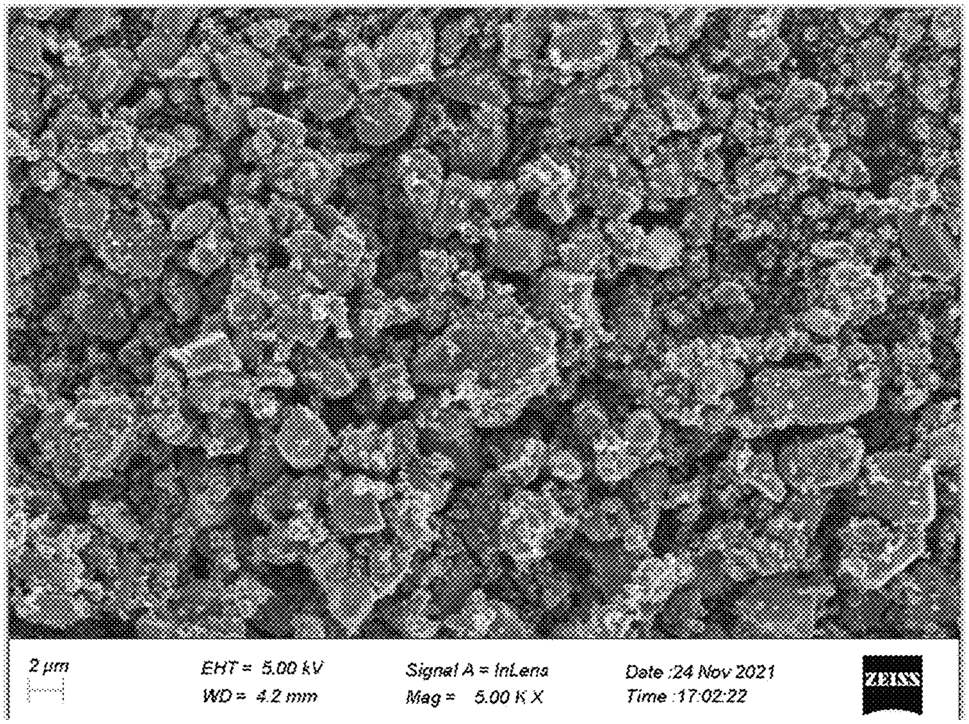
FIG. 2 is the scanning electron microscope image of the high-compaction lithium iron phosphate positive electrode material of the present disclosure.
Figure 3:
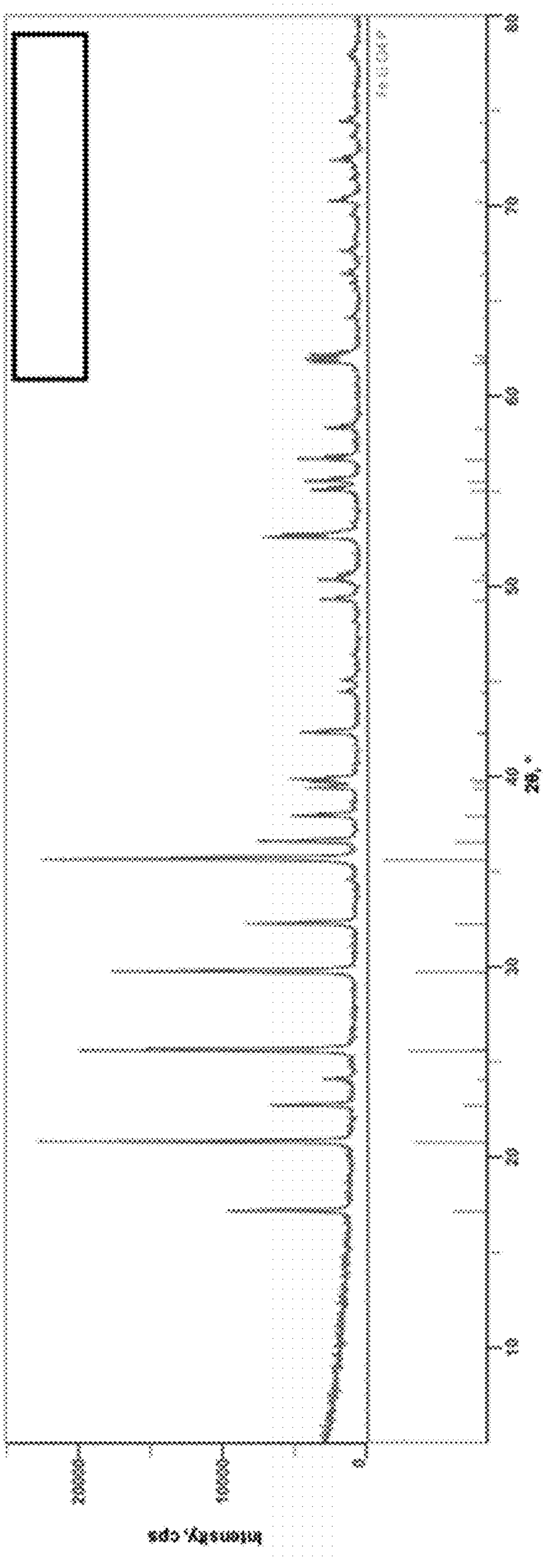
FIG. 3 is the XRD spectrum of the high-compaction lithium iron phosphate positive electrode material of the present disclosure.

The morphology and structure of the high-compaction lithium iron phosphate positive electrode material were characterized by scanning electron microscopy and XRD, and the results are shown in FIG. 2 and FIG. 3. FIG. 2 is the scanning electron microscope image of the high-compaction lithium iron phosphate positive electrode material of the present disclosure, and FIG. 3 is the XRD spectrum of the high-compaction lithium iron phosphate positive electrode material of the present disclosure.

It can be seen from FIG. 2 that the high-compaction lithium iron phosphate positive electrode material of the present disclosure comprises large single-crystal particles and small single-crystal particles, which achieves the blending of large and small particles; where the particle size of the large single crystal particle is about 2 to 4 μm, and the particle size of the small single-crystal particle is about 0.2-0.4 μm; the proportion of the large single-crystal particles is 10-30%, and the proportion of the small single-crystal particles is 70-90%; and both the large single-crystal particle and the small single-crystal particle are near spherical in morphology. It can be seen from FIG. 3 that the high-compaction lithium iron phosphate positive electrode material of the present disclosure has a high crystallinity, and its diffraction peak coincides with the standard diffraction peak of lithium iron phosphate.

The physical and chemical indicators of the high-compaction lithium iron phosphate positive electrode material were characterized, where the powder resistivity was the data tested under the pressure of 8 MPa, the compacted density was the data tested under the pressure of 3 T, and the specific surface area was measured by BET method. The analysis results are shown in the Table 2.

TABLE 2

| Items | | Units | Results |
|---|---|---|---|
| Elemental composition | Li | wt % | 4.46 |
| | Fe | | 34.3 |
| | P | | 19.08 |
| | C | | 1.55 |
| | B | ppm | 8953.7 |
| | Ti | | 1185.4 |
| | V | | 1615.3 |
| | Sum up of Ni, Cr, Cu and Zn | | 32.9 |
| Particle size | D50 | μm | 1.3 |
| Specific surface area | | $m^2/g$ | 10.9 |
| Compacted density | | g/mL | 2.67 |
| Magnetic substance | | ppm | 0.21 |
| Moisture | | ppm | 438 |
| Powder resistivity | | Ω · cm | 12.5 |

It can be seen from Table 2 that the high-compaction lithium iron phosphate positive electrode material of the present disclosure has a major elemental composition of Li, Fe and P, doped with B, Ti and V, has a carbon coating, and a very low impurity content; its compacted density is 2.67 g/mL, which is higher than the lithium iron phosphate commonly seen on the market; it has an excellent powder resistivity, indicating that it has good electrical conductivity, which is beneficial to achieve better rate performance.

The high-compaction lithium iron phosphate positive electrode material was assembled according to the following method into a button battery and was tested for charge-discharge performance and cycle performance:

(1) Battery Assembly

The high-compaction lithium iron phosphate positive electrode material of the present disclosure, a conductive carbon black (SP) conductive agent, polyvinylidene fluoride (PVDF), and N-methylpyrrolidone (NMP) were mixed uniformly through a high-speed mixer, where the mass ratio of the high-compaction lithium iron phosphate positive electrode material of the present disclosure, the SP conductive agent, and PVDF was 90:5:5. Then the mixture was coated on an aluminum foil by an automatic coating machine, the coated aluminum foil was dried in an oven, rolled to have a required compacted density, cut into small discs of a required size, weighed, and then dried again to obtain a positive electrode plate; and lithium plate was used as a negative electrode plate, and a positive electrode case, a negative electrode case, the positive electrode plate, the lithium plate, a separator, and an electrolyte were assembled into a button battery as required; and the button battery was hung on the battery test system to rest before testing.

(2) Charge and Discharge Performance Test

Figure 4:
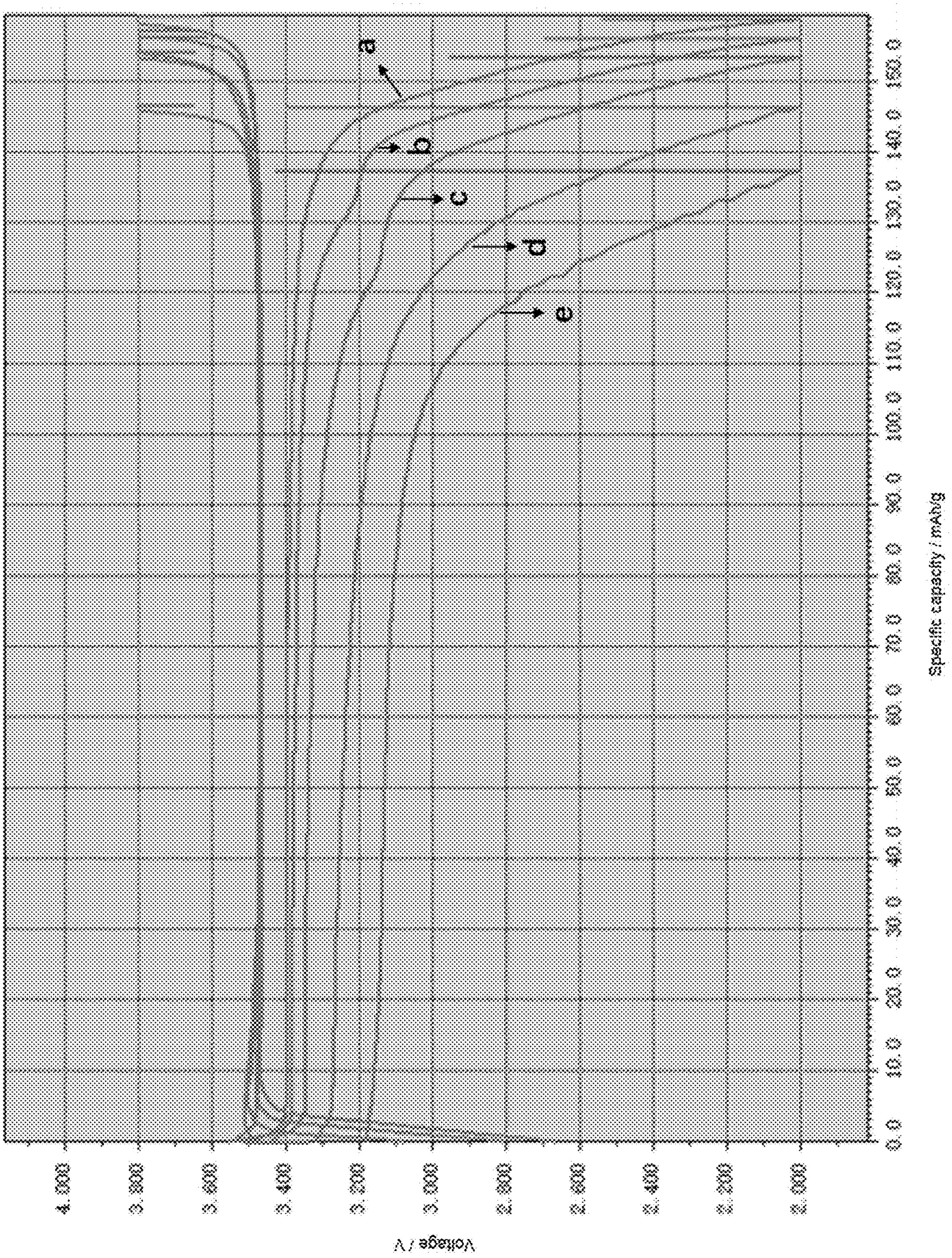
FIG. 4 is the charge-discharge graph of the high-compaction lithium iron phosphate positive electrode material of the present disclosure.

The above assembled button battery was put on LAND battery test system for testing at a test temperature of 24-26° C., the battery was charged to 3.75 V at 0.1 C rate to obtain a specific charge capacity, and then the battery was discharged at 0.1 C, 0.2 C, 0.5 C and 1 C rate to 2.0 V to obtain a specific discharge capacity. The test results are shown in Table 3 and FIG. 4. FIG. 4 is the charge-discharge graph of the high-compaction lithium iron phosphate positive electrode material of the present disclosure. In FIG. 4, a, b, c, d and e are the charge-discharge curves at 0.1 C, 0.2 C, 0.5 C, 1 C and 3 C, respectively.

TABLE 3

| Items | Results |
|---|---|
| First specific charge capacity at 0.1 C | 162.3 mAh/g |
| First specific discharge capacity at 0.1 C | 159.5 mAh/g |
| First discharge efficiency | 98.30% |
| Constant-voltage charge capacity | 3.1 mAh/g |
| Discharge capacity at 2.95 V | 154.1 mAh/g |

It can be seen from Table 3 that the high-compaction lithium iron phosphate positive electrode material of the present disclosure has a relatively high specific capacity. It can be seen from FIG. 4 that the high-compaction lithium iron phosphate positive electrode material of the present disclosure has excellent rate performance, less polarization, and no significant polarization caused by large particles, indicating that the doping of the present disclosure is effective.

(3) Cycle Performance Test

Figure 5:
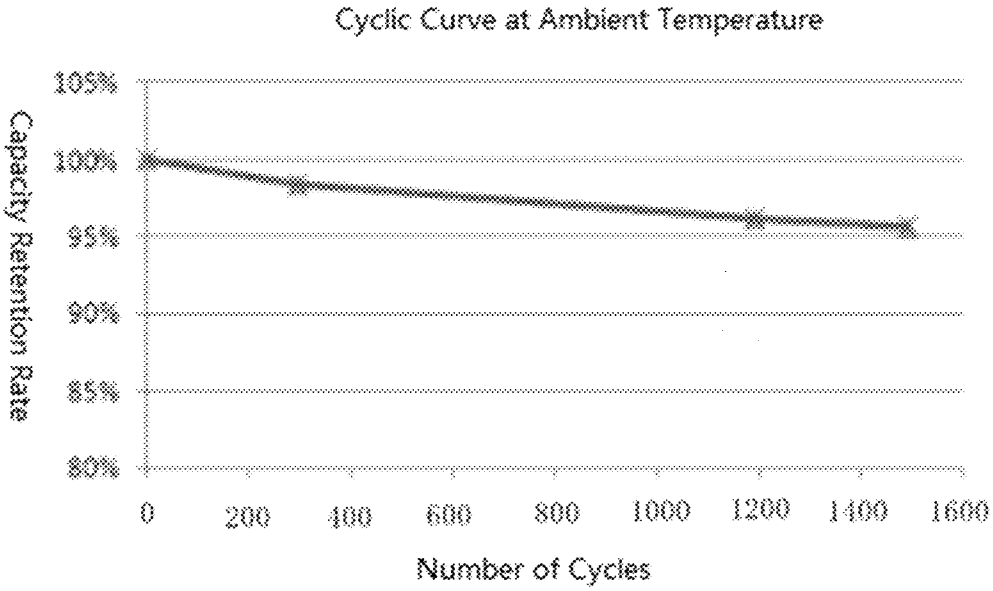
FIG. 5 is the cycle performance graph of the high-compaction lithium iron phosphate positive electrode material of the present disclosure.

The above assembled button battery was subjected to cycle performance test at 1 C at ambient temperature, the test temperature was 24-26° C., the test rate was 1 C, and the test results are shown in FIG. 5, which is the cycle performance graph of the high-compaction lithium iron phosphate positive electrode material of the present disclosure. It can be seen from FIG. 5 that the high-compaction lithium iron phosphate positive electrode material of the present disclosure was cycled 1500 times at 1 C at ambient temperature, and its capacity retention rate remained above 95%, so the material has excellent cycle performance.

EXAMPLE 3

Lithium carbonate and the anhydrous ferric phosphate obtained from Example 1 were mixed at a mass ratio of 0.3:1, and polyethylene glycol (PEG) and water were added simultaneously and the mixture was slurried, the material obtained after slurrying was ground by a sand mill to have a particle size of 700 nm to obtain a slurry, the mass fraction of the solids in the slurry was 35%; and then the slurry was spray-dried to have a particle size of 6 μm.

The above spray-dried material was put into a roller furnace into which nitrogen was introduced, the furnace pressure in the roller furnace was adjusted to 100 Pa, and the spray-dried material was calcinated at 850° C. for 12 hours to obtain a precursor material, the carbon content of the precursor material was maintained at 0.15 wt %, the entire calcination cycle was 30 hours, and the cooling time was 6 hours.

The above precursor material was pulverized to have a particle size of 1.9 μm by a pulverizer, then pure water was added, then a mixture of glucose and PEG was added, and the solution was stirred and slurried, and then lithium hydroxide, ammonium metavanadate and boric acid were added, and stirred at a speed of 300 r/min to be dissolved; then the material obtained after stirring was put into a sand mill and ground to have a particle size of 600 nm, then tetrabutyl titanate was added with a metering pump while the material was being stirred over a period of 60 min, and then the material was continued to be stirred at a speed of 300 r/min for 20 min; where, the mass ratio of the precursor material obtained after the pulverization, pure water, glucose, PEG, lithium hydroxide, ammonium metavanadate, boric acid, and tetrabutyl titanate was 1:4:0.05:0.05:0.015:0.005:0.05:0.01.

The above material obtained after mixing was spray-dried to obtain a spray-dried material having a particle size of 20 μm, a tap density of 1.95 g/mL, and a water mass fraction of less than 0.5%. Then the spray-dried material was put into a roller furnace, the furnace pressure in the roller furnace was adjusted to 50 Pa, the humidity in the roller furnace was kept at 3% or less, and calcination was carried out at 750° C. for 7 hours, then cooling was carried out for 8 hours, and the material was discharged after being cooled to a temperature ≤80° C. to obtain the high-compaction lithium iron phosphate positive electrode material of the present disclosure.

After the above high-compaction lithium iron phosphate positive electrode material was discharged, it went through air jet pulverization to have a particle size D50 of 1.3 μm, and then it underwent screening, iron-removal and packaging. The iron removal removed iron with an electromagnetic iron remover until the magnetic substance in the material was ≤0.5 ppm; and the packaging was carried out in a constant temperature and humidity room.

EXAMPLE 4

Lithium carbonate and the anhydrous ferric phosphate obtained from Example 1 were mixed at a mass ratio of 0.25:1, and polyethylene glycol (PEG) and water were added simultaneously and the mixture was slurried, the material obtained after slurrying was ground by a sand mill to have a particle size of 700 nm to obtain a slurry, the mass fraction of the solids in the slurry was 35%; and then the slurry was spray-dried to have a particle size of 6 μm.

The above spray-dried material was put into a roller furnace into which nitrogen was introduced, the furnace pressure in the roller furnace was adjusted to 100 Pa, and the spray-dried material was calcinated at 800° C. for 18 hours to obtain a precursor material, the carbon content of the precursor material was maintained at 0.12 wt %, the entire calcination cycle was 30 hours, and the cooling time was 6 hours.

The above precursor material was pulverized to have a particle size of 1.9 μm by a pulverizer, then pure water was added, then a mixture of glucose and PEG was added, and the solution was stirred and slurried, and then lithium hydroxide, ammonium metavanadate and boric acid were added, and stirred at a speed of 300 r/min to be dissolved; then the material obtained after stirring was put into a sand mill and ground to have a particle size of 600 nm, then tetrabutyl titanate was added with a metering pump while the material was being stirred over a period of 60 min, and then the material was continued to be stirred at a speed of 300 r/min for 20 min; where, the mass ratio of the precursor material obtained after the pulverization, pure water, glucose, PEG, lithium hydroxide, ammonium metavanadate, boric acid, and tetrabutyl titanate was 1:4:0.05:0.05:0.015:0.005:0.05:0.01.

The above material obtained after mixing was spray-dried to obtain a spray-dried material having a particle size of 17 μm, a tap density of 1.89 g/mL, and a water mass fraction of less than 0.5%. Then the spray-dried material was put into a roller furnace, the furnace pressure in the roller furnace was adjusted to 50 Pa, the humidity in the roller furnace was kept at 3% or less, and calcination was carried out at 700° C. for 8 hours, then cooling was carried out for 8 hours, and the material was discharged after being cooled to a temperature ≤80° C. to obtain the high-compaction lithium iron phosphate positive electrode material of the present disclosure.

After the above high-compaction lithium iron phosphate positive electrode material was discharged, it went through air jet pulverization to have a particle size D50 of 1.3 μm, and then it underwent screening, iron-removal and packaging. The iron removal removed iron with an electromagnetic iron remover until the magnetic substance in the material was ≤0.5 ppm; and the packaging was carried out in a constant temperature and humidity room.

The above embodiments are only preferred embodiments of the present disclosure, but the protection scope of the present disclosure is not limited thereto, and the equivalents or modifications made by any technical person familiar with the technical field according to the technical solution and the inventive concept of the present disclosure within the technical scope disclosed in the present disclosure, should be encompassed by the present disclosure.

What is claimed is:

1. A high-compaction lithium iron phosphate positive electrode material, comprising:

lithium iron phosphate of formula (I), and carbon coated on a surface of the lithium iron phosphate, $$LiFe_{1-x-y}V_xTi_y(BO_3)_z(PO_4)_{1-z}, \quad (I)$$

wherein, $0.001 \le x \le 0.01$, $0.001 \le y \le 0.01$, and $0.05 \le z \le 0.2$, and wherein a compacted density of the lithium iron phosphate positive electrode material is 2.5-3 g/mL.

2. The high-compaction lithium iron phosphate positive electrode material according to claim 1, wherein the lithium iron phosphate comprises a first-size particle of a particle size of 2-4 μm and a second-size particle of a particle size of 0.2-0.4 μm.

3. The high-compaction lithium iron phosphate positive electrode material according to claim 2, wherein, the proportion of the first-size particles is 10-30%, and the proportion of the second-size particles is 70-90%.

4. The high-compaction lithium iron phosphate positive electrode material according to claim 1, wherein a specific capacity of the material is 100-200 mAh/g.

5. A positive electrode comprising the high-compaction lithium iron phosphate positive electrode material according to claim 1.

6. A battery comprising the positive electrode according to claim 5.

7. A method for preparing the high-compaction lithium iron phosphate positive electrode material according to claim 1, comprising steps of:

step A): mixing a phosphorus source, an iron source, a lithium source, a carbon source and water to obtain a mixture, to which spray drying and sintering are sequentially applied to obtain a precursor material; and step B): mixing a lithium source, a carbon source, a boron source, a vanadium source, a titanium source, water and the precursor material obtained from step A) to obtain a mixture, to which spray drying and sintering are sequentially applied to obtain the high-compaction lithium iron phosphate positive electrode material.

8. The method according to claim 7, wherein the phosphorus source is one or more selected from iron phosphate, ammonium monohydrogen phosphate, ammonium dihydrogen phosphate, diammonium hydrogen phosphate, and ammonium phosphate;

the iron source is one or more selected from ferric phosphate, ferrous oxalate, ferric nitrate, ferrous chloride, and ferrous sulfate;

the lithium source is one or more selected from lithium carbonate, lithium hydroxide, lithium phosphate, and lithium bicarbonate;

the carbon source is one or more selected from glucose, sucrose, polyethylene glycol, acetylene black, citric acid, and soluble starch;

the boron source is one or more selected from boric acid, trimethyl borate, lithium metaborate, lithium borate, and diboron trioxide;

the vanadium source is one or more selected from vanadium carbonate, vanadium pentoxide, and ammonium metavanadate; and the titanium source is one or more selected from tetrabutyl titanate and tetraisopropyl titanate.

9. The method according to claim 7, wherein, a carbon content of the precursor material in step A) is 0.1-0.3 wt %; and a molar ratio of Li, Fe, V, Ti, B, P, which are mixed in step B), is 1:1-x-y:x:y:z:1-z, wherein, $0.001 \le x \le 0.01$, $0.01 \le y \le 0.1$, and $0.05 \le z \le 0.2$.

10. The method according to claim 7, wherein, in step A), the sintering is carried out at a temperature of 700-900° C. for 10-15 hours; and in step B), the sintering is carried out at a temperature of 600-700° C. for 4-8 hours.

* * * * *